(12) United States Patent
Goyal (10) Patent No.: US 6,993,477 B1
(45) Date of Patent: Jan. 31, 2006

(54) METHODS AND APPARATUS FOR ADAPTIVE SIGNAL PROCESSING INVOLVING A KARHUNEN-LOÈVE BASIS

(75) Inventor: Vivek K. Goyal, Hoboken, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1219 days.

(21) Appl. No.: 09/590,251

(22) Filed: Jun. 8, 2000

(51) Int. Cl.
*G10L 21/06* (2006.01)

(52) U.S. Cl. .................................. 704/203; 704/213

(58) Field of Classification Search ............... 704/203, 704/204, 200, 213, 221, 222, 230
See application file for complete search history.

(56) References Cited

U.S. PATENT DOCUMENTS

| | | | | |
|---|---|---|---|---|
| 5,018,065 A | * | 5/1991 | McWhirter et al. | 712/19 |
| 5,583,963 A | * | 12/1996 | Lozach | 704/219 |
| 5,768,284 A | * | 6/1998 | Cox | 379/114.04 |
| 5,889,857 A | * | 3/1999 | Boudy et al. | 379/406.14 |
| 5,911,130 A | * | 6/1999 | Shimizu et al. | 704/500 |
| 6,292,520 B1 | * | 9/2001 | Tsukahara | 375/346 |
| 6,463,081 B1 | * | 10/2002 | Chen et al. | 370/532 |

OTHER PUBLICATIONS

J.-F. Yang et al., "Adaptive Eigensubspace Algorithms for Direction or Frequency Estimation and Tracking," IEEE Trans. Acoust. Speech Signal Proc., vol. 36, No. 2, pp. 241-251, Feb. 1988.

P.A. Regalia et al., "Rational Subspace Estimation Using Adaptive Lossless Filters," IEEE Trans. Signal Proc., vol. 40, No. 10, pp. 2392-2405, Oct. 1992.

J.-P. Delmas, "Performances Analysis of a Givens Parameterized Adaptive Eigenspace Algorithm," Signal Proc., vol. 68, No. 1, pp. 87-105, Jul. 1998.

J.-P. Delmas, "Adaptive Harmonic Jammer Canceler," IEEE Trans. Signal Proc., vol. 43, No. 10, pp. 2323-2331, Oct. 1995.

(Continued)

*Primary Examiner*—Abul K. Azad (57) ABSTRACT

A signal processing device utilizes a stochastic approximation of a gradient descent algorithm for updating a transform. The signal processing device is configured to implement the transform for producing a desired transformed output signal, and the transform is updated using the stochastic approximation of the gradient algorithm based on received data associated with the signal being processed. The transform is represented in a reduced-parameter form, such as a Givens parameterized form or a Householder form, such that the reduced-parameter form for an N×N transform comprises fewer than $N^2$ parameters. The updating process is implemented using computations involving the reduced-parameter form, and an adaptation of the transform is represented directly as one or more changes in the reduced-parameter form. The gradient algorithm may be configured to minimize a negative gradient of a pairwise energy compaction property of the transform. Advantageously, the gradient algorithm may be made locally convergent in mean for a specified step size. The invention can also be implemented in a backward adaptive form in which the updating process is driven by quantized data.

25 Claims, 7 Drawing Sheets

OTHER PUBLICATIONS

J.-P. Delmas, "Performances Analysis of Parameterized Adaptive Eigensubspace Algorithms," Proc. IEEE Int. Conf. Acoust., Speech and Signal Proc., Detroit, MI, pp. 2056-2059, May 1995.

J.-F. Yang et al., "Adaptive High-Resolution Algorithms For Tracking Nonstationery Sources Without the Estimation of Source Number," IEEE Trans. Signal Proc., vol. 42, pp. 563-571, Mar. 1994.

P.A. Regalia, "An Unbiased Equation Error Identifier and Reduced-Order Approximations," IEEE Trans. Signal Proc., vol. 42, No. 6, pp. 1397-1412, Jun. 1994.

B. Champagne, "Adaptive Eigendecomposition of Data Covariance Matrices Based on First-Order Perturbations," IEEE Trans. Signal Proc., vol. 42, No. 10, pp. 2758-2770, Oct. 1994.

B. Yang, "Projection Approximation Subspace Tracking," IEEE Trans. Signal Proc., vol. 43, No. 1, pp. 95-107, Jan. 1995.

B. Champagne et al., "Plane Rotation-Based EVD Updating Schemes For Efficient Subspace Tracking," IEEE Trans. Signal Proc., vol. 46, No. 7, pp. 1886-1900, Jul. 1998.

P.A. Regalia, "An Adaptive Unit Norm Filter With Applications to Signal Analysis and Karhunen-Loève Transformations," IEEE Transactions on Circuits and Systems, vol. 37, No. 5, pp. 646-649, May 1990.

F.J. Vanpoucke et al., "Factored Orthogonal Transformations for Recursive Eigendecomposition," IEEE Transactions on Circuits and Systems-II: Analog and Digital Signal Processing, vol. 44, No. 3, pp. 253-256, Mar. 1997.

* cited by examiner

$X_1 = \text{diag}([1, \tfrac{7}{8}, \tfrac{5}{8}, \tfrac{1}{2}])$

FIG. 3A

$X_2 = \text{diag}([1, \tfrac{1}{2}, \tfrac{1}{4}, \tfrac{1}{8}])$

METHODS AND APPARATUS FOR ADAPTIVE SIGNAL PROCESSING INVOLVING A KARHUNEN-LOÈVE BASIS

FIELD OF THE INVENTION

The present invention relates generally to signal processing techniques and devices, and more particularly to signal processing techniques and devices which involve the utilization of a Karhunen-Loève (KL) basis.

BACKGROUND OF THE INVENTION

Many areas of signal processing utilize so-called eigendecompositions of covariance matrices. Such decompositions generally provide a basis, commonly known as a Karhunen-Loève (KL) basis, in which signal expansion coefficients are uncorrelated. The KL basis or a signal represented in the KL basis can immediately reveal crucial information in many applications. For example, in an array signal processing application, the KL basis is used to estimate directions of arrival of plane waves. This application allows the received signal to be separated into a signal subspace and a noise subspace, and is therefore called a subspace method. The signal space often changes with time, necessitating the use of subspace tracking techniques.

Transform coding is another area in which it is useful to track a KL basis. In transform coding, a KL basis gives the best representation for encoding a Gaussian vector with scalar quantization and scalar entropy coding. When a KL basis is not known in advance or varies slowly, adaptive estimation or tracking can enhance performance.

Gradient methods for adaptive signal-subspace and noise-subspace estimation are described in J.-F. Yang et al., "Adaptive Eigensubspace Algorithms for Direction or Frequency Estimation and Tracking," IEEE Trans. Acoust. Speech Signal Proc., Vol. 36, No. 2, pp. 241–251, February 1988. However, these methods are complicated both numerically and theoretically by orthonormalization steps. Adaptation of a Givens parameterized transform, which eliminates the need for explicit orthonormalization, was suggested as a method for finding a Karhunen-Loève transform in P. A. Regalia, "An Adaptive Unit Norm Filter With Applications to Signal Analysis and Karhunen-Loève Transformations," IEEE Trans. Circuits and Systems, Vol. 37, No. 5, pp. 646–649, May 1990. However, this approach fails to provide suitable convergence results. Subsequent work either does not address step size selection, e.g., P. A. Regalia et al., "Rational Subspace Estimation Using Adaptive Lossless Filters," IEEE Trans. Signal Proc., Vol. 40, No. 10, pp. 2392–2405, October 1992, or considers only the most rigorous form of convergence in which step sizes must shrink to zero, gradually but not too quickly, e.g., J.-P. Delmas, "Performances Analysis of Parameterized Adaptive Eigensubspace Algorithms," Proc. IEEE Int. Conf. Acoust., Speech and Signal Proc., Detroit, Mich., pp. 2056–2059, May 1995, J.-P. Delmas, "Adaptive Harmonic Jammer Canceler," IEEE Trans. Signal Proc., Vol. 43, No. 10, pp. 2323–2331, October 1995, and J.-P. Delmas, "Performances Analysis of a Givens Parameterized Adaptive Eigenspace Algorithm," Signal Proc., Vol. 68, No. 1, pp. 87–105, July 1998. The latter form of adaptation, with step sizes approaching zero, is generally not suitable for use in practical applications.

For details on other conventional basis tracking techniques, see J.-F. Yang et al., "Adaptive High-Resolution Algorithms For Tracking Nonstationery Sources Without the Estimation of Source Number," IEEE Trans. Signal Proc., Vol. 42, pp. 563–571, March 1994, P. A. Regalia, "An Unbiased Equation Error Identifier and Reduced-Order Approximations," IEEE Trans. Signal Proc., Vol. 42, No. 6, pp. 1397–1412, June 1994, B. Champagne, "Adaptive Eigendecomposition of Data Covariance Matrices Based on First-Order Perturbations," IEEE Trans. Signal Proc., Vol. 42, No. 10, pp. 2758–2770, October 1994, B. Yang, "Projection Approximation Subspace Tracking," IEEE Trans. Signal Proc., Vol. 43, No. 1, pp. 95–107, January 1995, and B. Champagne et al., "Plane Rotation-Based EVD Updating Schemes For Efficient Subspace Tracking," IEEE Trans. Signal Proc., Vol. 46, No. 7, pp. 1886–1900, July 1998.

The above-identified conventional techniques for tracking a KL basis fail to provide adequate performance, such as local convergence within specified step size bounds. In addition to exhibiting a lack of suitable convergence guarantees, most conventional techniques are computationally complicated and not highly parallelizable. A need therefore exists for improved techniques for tracking a KL basis.

SUMMARY OF THE INVENTION

The present invention provides improved signal processing techniques and devices for Karhunen-Loève (KL) basis tracking through the use of stochastic approximations to specified gradient descents. In order to keep computational requirements low and to provide a degree of parallelizability, the signal processing techniques and devices of the present invention utilize computations which have locality and regularity properties.

In accordance with the invention, a transform is represented in a reduced-parameter form, such as a Givens parameterized form or a Householder form, such that the reduced-parameter form for an N×N transform comprises fewer than $N^2$ parameters. An updating process for the transform is implemented using computations involving the reduced-parameter form, and an adaptation of the transform is represented directly as one or more changes in the reduced-parameter form.

An illustrative embodiment of the invention provides a gradient descent algorithm particularly well suited for transform adaptation in transform coding applications. The algorithm can be implemented in one or more signal processing devices, such as a digital signal processor (DSP), filter, encoder, decoder, etc. The algorithm in the illustrative embodiment uses a pairwise energy compaction property of the KL transform. Advantageously, the algorithm converges locally in mean within specified step size bounds. In addition, the algorithm allows trade-offs to be made between speed of convergence and steady-state error. It is particularly simple to implement and exhibits a rate of convergence which is generally better than that of more computationally demanding conventional approaches.

The invention provides a number of other advantages over conventional techniques. For example, the invention avoids the need for an explicit eigendecomposition operation in implementing the transform, and does not require explicit estimation of the autocorrelation matrix of the source signal being processed. In addition, the invention provides better parallelizability of computations than the previously-noted conventional techniques, and allows the transform update process to be driven by quantized data.

The algorithm in the illustrative embodiment preferably operates on Givens parameterized matrices, i.e., matrices which are a product of multiple Givens rotations, so as to ensure orthogonality, increase numerical robustness, and minimize the number of parameters.

Although particularly well suited for use in transform coding applications, the invention can also be applied to other types of signal processing applications, including array signal processing, general-purpose signal filtering, or other applications involving a KL basis. Moreover, the techniques of the invention are applicable to a wide variety of different types of signals, including data, speech, audio, images, video and other types of signals.

DETAILED DESCRIPTION OF THE INVENTION

The invention will be illustrated below in conjunction with exemplary signal processing techniques and devices. The techniques and devices described may be applied to processing of a wide variety of different types of signals, including data signals, speech signals, audio signals, image signals, and video signals, in either compressed or uncompressed formats. The term "vector" as used herein is intended to include any grouping of coefficients or other components representative of at least a portion of a signal. The term "signal processing device" is intended to include any type of device suitable for providing at least a subset of the processing operations of the present invention, such as a digital signal processor (DSP), microprocessor, computer, application-specific integrated circuit (ASIC), filter, encoder, decoder, etc. The particular device implementation used in a given application will of course be a function of the particular requirements of that application.

As described previously, it is often desirable in signal processing applications to update a Karhunen-Loève (KL) basis estimate as data vectors are processed. An illustrative embodiment of the invention to be described below provides a Givens parameterized gradient descent algorithm for updating a KL basis estimate. This embodiment, which is based on pairwise maximization of coding gain, is contrasted herein to two conventional algorithms based on stochastic gradient descents of global cost functions. Although all three of these algorithms can be shown to converge locally in mean, the algorithm of the illustrative embodiment of the invention converges much faster than the other two while also being computationally the simplest of the three. It should be emphasized, however, that the illustrative algorithm is presented by way of example, and should not be construed as limiting the scope of the invention.

The three algorithms to be described herein are also referred to as Algorithm 1, Algorithm 2 and Algorithm 3. It should be understood that Algorithms 1 and 2 are the conventional algorithms based on stochastic gradient descents of global cost functions, and are described for purposes of comparison with Algorithm 3, which is the illustrative embodiment of the invention based on pairwise maximization of coding gain.

The approach utilized in Algorithms 1, 2 and 3 may be analogized in some respects to Wiener filtering, as described in, e.g., P. M. Clarkson, "Optimal and Adaptive Signal Processing," CRC Press, Boca Raton, Fla., 1993, which is incorporated by reference herein. For optimal finite-impulse-response Wiener filtering, one requires knowledge of second-order moments of signals and one needs to solve a linear system of equations, which in some contexts may be considered expensive. The linear system of equations is commonly replaced with a gradient descent and the exact moments are replaced with immediate stochastic estimates, leading to the well-known least-mean-squares (LMS) algorithm. By analogy, determining the optimal transform for transform coding requires the determination of an eigendecomposition, typically an expensive computation. Algorithms 1, 2 and 3 replace this computation with a gradient descent. It should also be noted that both the LMS algorithm and the gradient descent algorithms can be driven by quantized data.

The following notation will be used in describing Algorithms 1, 2 and 3. Let $\{x_n\}_{n \in N}$ be a sequence of $\mathbb{R}^N$-valued random vectors and let $X_n = E[x_n x_n^T]$. It is assumed for simplicity and clarity of illustration that the dependence of $X_n$ on n is mild. The algorithms are designed to produce a sequence of orthogonal transforms $T_n$ such that $T_n X_n T_n^T$ is approximately diagonal for each n. The algorithms are preferably strictly causal, i.e., $T_n$ should depend only on $$\{x_k\}_{k=0}^{n-1}.$$

In general, $X_n$ is not known, but instead must be inferred or otherwise estimated from $$\{x_k\}_{k=0}^{n-1}.$$

An orthogonal $T_n$ such that $T_n X_n T_n^T$ is diagonal is called a Karhunen-Loève transform (KLT) of the source vector $x_n$. Finding a KLT is equivalent to finding an orthonormal set of eigenvectors of the symmetric, positive semidefinite covariance matrix $X_n$; i.e., solving a so-called symmetric eigenproblem, as described in G. H. Golub et al., "Matrix Computations," Johns Hopkins Univ. Press, Baltimore, Md., Second Edition, 1989, which is incorporated by reference herein. Thus, finding an algorithm for transform adaptation may be viewed as an attempt to approximately solve a sequence of symmetric eigenvalue problems with noisy data.

The present invention avoids the need for an explicit eigendecomposition by using incoming data samples to make small adjustments in the transform so that changes in the KL basis are tracked and any initial misadjustment is eliminated. Algorithms 1 and 2 make the transform adjustments in the direction of the negative gradient of a cost function that is minimized by the desired diagonalizing transform. Examples of such cost functions and corresponding gradient descent analysis with respect to these functions will be given below. Algorithm 3 applies a gradient descent to an energy compaction property that holds for any pair of transform coefficients, instead of minimizing a single global cost function through gradient descent.

Certain additional notation used in the description of Algorithms 1, 2 and 3 will now be introduced. A Givens rotation G of $\theta$ radians counterclockwise in the (i,j) coordinate plane is an identity matrix except for $$\begin{bmatrix} G_{ii} & G_{ij} \\ G_{ji} & G_{jj} \end{bmatrix} = \begin{bmatrix} \cos\theta & \sin\theta \\ -\sin\theta & \cos\theta \end{bmatrix}.$$

This rotation will be denoted $G_{i,j,\theta}$. A Givens rotation is also sometimes referred to as a Jacobi rotation.

Any N×N orthogonal matrix can be factored as a product of K=N(N−1)/2 Givens rotations with i<j and each rotation angle $\theta \in [-\pi/4, \pi/4)$. See, for example, F. J. Vanpoucke et al., "Factored Orthogonal Transformations For Recursive Eigendecomposition," IEEE Trans. Circuits Syst.-II: Anal. Dig. Sig. Proc., Vol. 44, No. 3, pp. 253–256, March 1997, which is incorporated by reference herein.

Givens parameterizations of orthogonal matrices will be used extensively in the description, so the following notation that eliminates one subscript will be used. To index only the needed (i, j) pairs, map (i,j) to k, where (i,j) is the kth entry in a lexicographical list of (i,j) $\in \{1,2,\ldots, N\}^2$ pairs with i<j. The reverse of this index mapping is denoted by $(i_k,j_k)$ being the pair corresponding to index k. A Givens parameterized representation is given by $$U_\Theta = G_{1,\theta_1} G_{2,\theta_2} \ldots G_{K,\theta_K},$$

where $\Theta=(\theta_1, \theta_2, \ldots, \theta_K)$ and the indices have been remapped according to $G_{k,\theta}=G_{i_k,j_k,\theta}$.

Figure 1:
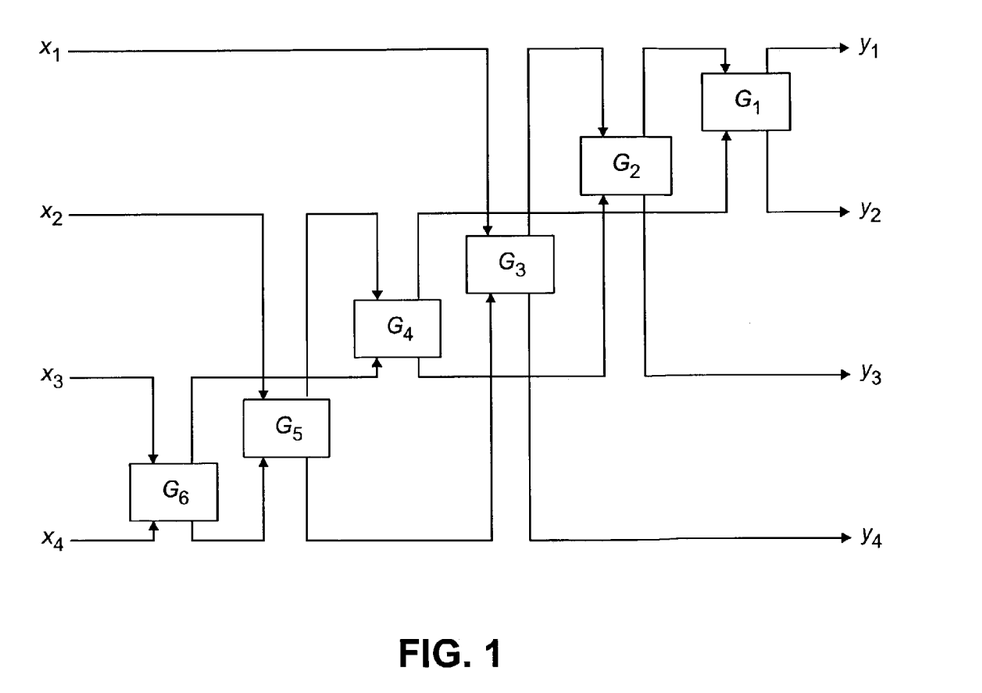
FIG. 1 is a schematic representation of a signal processing device which implements a Givens parameterized form of an orthogonal transform in accordance with the invention.

FIG. 1 shows a signal processing device which implements the above-described Givens parameterized form of an orthogonal transform with the index remapping for a case of N=4. Each $G_k$ block in the figure represents a Givens rotation matrix. The Givens parameterized form ensures orthogonality and minimizes the number of parameters. Matrices in this form can be multiplied using conventional techniques such as those described in, e.g., the above-cited F. J. Vanpoucke et al. reference. This is an important aspect of the present invention, as it produces a multiplicative update matrix in Givens parameterized form, i.e., an orthogonal matrix $U_{\Theta_n}$ in Givens form is generated such that $T_{n+1}=U_{\Theta_n} \cdot T_n$.

Global Gradient Descent Algorithms (Algorithms 1 and 2)

This section will consider diagonalizing a fixed matrix X, so its time index is not shown. The problem of finding a KLT T corresponding to a covariance matrix X can be cast as a minimization problem if there is a cost function that is minimized if and only if T is a KLT. Many such cost functions exist, and two are described in greater detail below, along with corresponding analyses of deterministic gradient descents of these cost functions. These analyses lead directly to convergence-in-mean results for the stochastic transform update algorithms, i.e., Algorithms 1 and 2.

One type of example cost function is the squared 2-norm of the off-diagonal elements of $Y=TXT^T$:

$$J_1(Y) = \sum_{i=1}^{N} \sum_{j=1, j\neq i}^{N} Y_{ij}^2.$$

This cost function attains its minimum value of zero if and only if T exactly diagonalizes X.

Another example of a cost function is $$J_2(Y) = \prod_{i=1}^{N} Y_{ii},$$

which, although less clearly connected to the diagonalization of X, is also minimum when T diagonalizes X. This can be seen as follows. As T varies over the set of orthogonal matrices, the diagonal elements of Y lie in the convex hull of the permutations of the eigenvalues of X, as described in A. W. Marshall et al., "Inequalities: Theory of Majorizations and Its Applications," Academic Press, San Diego, Calif., 1979, which is incorporated by reference herein. Furthermore, the sum of the diagonal elements of Y is constant. The minimum of the product occurs when the elements are as far apart as possible, i.e., at a corner of the convex set. Since the corners are permutations of the eigenvalues, $J_2$ is minimized when T is a diagonalizing transform.

In high resolution transform coding with optimal bit allocation, the mean-squared error (MSE) distortion per component at rate R bits per component is proportional to $$\sqrt[N]{J_2(Y)}\, 2^{-2R}.$$

In this context, it is shown in A. Gersho et al., "Vector Quantization and Signal Compression," Kluwer Acad. Pub., Boston, Mass., 1992, which is incorporated by reference herein, that $J_2$ is minimized when T is a KLT.

Both of the above-described cost functions $J_1$ and $J_2$ are continuous in each component of Y. It should be noted that many other qualitatively different cost functions may be used, including, e.g., non-negative-coefficient linear combinations of the cost functions $J_1$ and $J_2$.

Given a cost function J(Y), defined on symmetric positive semidefinite matrices, that is minimized if and only if Y is diagonal, one skilled in the art of adaptive filtering could approach the design of an adaptive KL transform as follows. First, compute the gradient $$\nabla_T J(TXT^T),$$

and then update according to $$T_{n+1}=T_n-\mu \nabla_T J(TXT^T)|_{T=T_n},$$

where $\mu$ is a small, positive step size. The initial difficulty with such an approach is that the orthogonality of $T_n$ does not imply the orthogonality of $T_{n+1}$. Furthermore, the gradient will generally be dense, making computations difficult. Using a descent over the Givens parameterized form of the transform alleviates the first difficulty, but not the second.

For clarity of illustration, deterministic descents using the cost functions $J_1$ and $J_2$ will now be described. Using the Givens parameterized representation of the transform matrix, finding a diagonalizing transform amounts to minimizing $J_1$ or $J_2$ over $\Theta \in [-\pi/4, \pi/4)^K$. A straightforward gradient descent would update the parameter vector through $$\Theta_{n+1} = \Theta_n - \mu \nabla_\Theta J_i(U_\Theta X U_\Theta^T)|_{\Theta=\Theta_n}, \tag{1}$$

with step size $\mu \in \mathbb{R}^+$. This approach can work, but is not computationally attractive because the gradient is dense, i.e., each component of $\nabla J_i$ depends on every component of $\Theta$. As an alternative, gradient descent can be used to compute a multiplicative update matrix. With $Y_n = T_n X T_n^T$, one can update by $$T_{n+1} = U_{\Theta_n} T_n, \tag{2}$$

where $$\Theta_n = -\mu \nabla_\Theta J_i(U_\Theta Y_n U_\Theta^T)|_{\Theta=0} \tag{3}$$

with step size $\mu \in \mathbb{R}^+$. As will now be detailed below, the gradient in equation (3) is sparse and easy to compute for both cost functions $J_1(Y)$ and $J_2(Y)$.

For notational convenience, define $A^{(k)}$, $1 \le k \le K$, elementwise by:

$$A_{ij}^{(k)} = \partial Z_{ij}/\partial \theta_k,$$

where $$Z = U_\Theta Y U_\Theta^T.$$

Expanding $U_\Theta$ and using the product rule of differentiation gives $$A^{(k)} = \underbrace{G_1 G_2 \ldots G_{k-1} H_k G_{k+1} \ldots G_K Y G_K^T \ldots G_2^T G_1^T}_{B^{(k)}} + \underbrace{G_1 G_2 \ldots G_K Y G_K^T \ldots G_{k+1}^T H_k^T G_{k-1}^T \ldots G_2^T G_1^T}_{B^{(k)T}}, \tag{4}$$

where $H_k$ is the derivative with respect to $\theta_k$ of the Givens matrix $G_k$, i.e., $H_k$ is all zeros except for $$\begin{bmatrix} (H_k)_{i_k i_k} & (H_k)_{i_k j_k} \\ (H_k)_{j_k i_k} & (H_k)_{j_k j_k} \end{bmatrix} = \begin{bmatrix} -\sin\theta_k & \cos\theta_k \\ -\cos\theta_k & -\sin\theta_k \end{bmatrix}.$$

Evaluating at $\Theta=0$ makes all the $G_i$ identity matrices. $H_k$ is sparse, giving $$B^{(k)}|_{\Theta=0} = \begin{bmatrix} Y_{j_k 1} & Y_{j_k 2} & \ldots & Y_{j_k N} \\ -Y_{i_k 1} & -Y_{i_k 2} & \ldots & -Y_{i_k N} \end{bmatrix} \begin{matrix} i_k \\ j_k \end{matrix}, \tag{5}$$

where only the nonzero entries, in the $i_k$ and $j_k$ rows, are shown.

As another notational aid, define $A^{(k,l)}$ elementwise by $A_{ij}^{(k,l)} = \partial A_{ij}^{(k)}/\partial \theta_l$. Calculation of $A^{(k,l)}$ is simple and similar to that of $A^{(k)}$ and thus is not further described herein. For additional details, see V. K. Goyal, "Beyond Traditional Transform Coding," Ph.D. Thesis, Univ. California, Berkeley, 1998, Published as Univ. California, Berkeley, Electron. Res. Lab. Memo. No. UCB/ERL M99/2, January 1999, which is incorporated by reference herein.

The minimization of $J_1$ by deterministic descent will now be described. Using equation (5), the components of the gradient of $J_1$ can be expressed as $$\frac{\partial J_1(U_\Theta Y U_\Theta^T)}{\partial \theta_k} = 2 \sum_{i \ne j} Z_{ij} A_{ij}^{(k)} = 2 \sum_{i \ne j} Z_{ij}(B_{ij}^{(k)} + B_{ji}^{(k)}). \tag{6}$$

The partial derivative (6) generally depends on all of the components of $\Theta$, but evaluating at $\Theta=0$ gives a very simple expression. Cancellation of like terms yields $$\frac{\partial J_1(U_\Theta Y U_\Theta^T)}{\partial \theta_k}\bigg|_{\Theta=0} = 4 Y_{i_k j_k}(Y_{j_k j_k} - Y_{i_k i_k}). \tag{7}$$

Thus the gradient computation in equation (3) requires a constant number of operations per parameter, independent of N. It should be noted that since the Frobenius norm is unchanged by orthogonal similarity transformations, minimizing $J_1$ is equivalent to maximizing $$J_1'(Y) = \sum_{i=1}^{N} Y_{ii}^2.$$

Of course, $J_1 + J_1'$ is a constant, so $\nabla J_1 = \nabla J_1'$, demonstrating an easy way to obtain equation (7) and that a gradient ascent of $J_1'$ is equivalent to the above-described gradient descent.

The equilibrium points of a descent with respect to $J_1$ are those for which equation (7) is zero for all k. The desired, stable equilibria are obtained when all $Y_{i_k j_k}$ are zero. The following gives step size bounds for local convergence around these equilibria.

Denote the eigenvalues of X by $\lambda_1 > \lambda_2 > \ldots \lambda_N$. It can be shown that the gradient descent update algorithm described by equations (2), (3), and (7) converges locally to a diagonalizing transform if $$0 < \mu < \left[2 \max_{i,j}(\lambda_i - \lambda_j)^2\right]^{-1} = [2(\lambda_1 - \lambda_N)^2]^{-1}.$$

This convergence property of the illustrative gradient descent algorithm can be proven as follows. Because the interest is in local properties, it can be assumed without loss of generality that $Y = \text{diag}([\lambda_1 \lambda_2 \ldots \lambda_N])$. The key to the proof is linearizing the autonomous, nonlinear, discrete-time dynamical system described by equations (2) and (3). More particularly, describe the system as $$\Theta_{n+1} = \Theta_n - \mu f(\Theta_n),$$

which upon linearization about the desired equilibrium 0 gives $$\hat{\Theta}_{n+1} = (I - \mu F)\hat{\Theta}_n, \text{ where } F_{ij} = \left[\frac{\partial}{\partial \theta_j} f_i(\Theta)\right]\bigg|_{\Theta=0}.$$

Since f is continuously differentiable, a sufficient condition for local convergence is that the eigenvalues of $I-\mu F$ lie inside the unit circle. See M. Vidyasagar, "Nonlinear Systems Analysis," Prentice-Hall, Englewood Cliffs, N.J., 1978, which is incorporated by reference herein. Evaluation of F then proceeds as follows. Differentiating equation (6) gives $$\frac{\partial^2 J_1(U_\Theta Y U_\Theta^T)}{\partial \theta_l \partial \theta_k} = 2 \sum_{i \neq j} \left( Z_{ij} A_{ij}^{(k,l)} + A_{ij}^{(k)} A_{ij}^{(l)} \right). \quad (8)$$

F is obtained by evaluating (8) at $\Theta=0$. Z reduces to Y, which is diagonal, so the first term makes no contribution. Simplifying the second term using equations (4) and (5) gives $$F_{kl} = \left[ \frac{\partial^2 J_1(U_\Theta Y U_\Theta^T)}{\partial \theta_l \partial \theta_k} \right]\bigg|_{\Theta=0} = \begin{cases} 4(\lambda_{i_k} - \lambda_{j_k})^2 & \text{if } k = l \\ 0 & \text{otherwise.} \end{cases}$$

The eigenvalues of $I-\mu F$ are $1-4\mu(\lambda_{i_k}-\lambda_{j_k})^2$. The proof is completed by requiring that these eigenvalues all lie inside the unit circle.

The minimization of $J_2$ by deterministic descent will now be described. The gradient of $J_2$ is given elementwise by $$\frac{\partial J_2(U_\Theta Y U_\Theta^T)}{\partial \theta_k} = J_2(U_\Theta Y U_\Theta^T) \sum_{m=1}^{N} \left( \frac{1}{Z_{mm}} A_{mm}^{(k)} \right). \quad (11)$$

To evaluate at $\Theta=0$, first note that $$A_{mm}^{(k)} \big|_{\Theta=0} = 2 B_{mm}^{(k)} \big|_{\Theta=0} = \begin{cases} 2 Y_{j_k m} & \text{if } m = i_k, \\ -2 Y_{i_k m} & \text{if } m = j_k, \\ 0 & \text{otherwise.} \end{cases}$$

Thus only the $m=i_k$ and $m=j_k$ terms of the sum contribute, and $$\frac{\partial J_2(U_\Theta Y U_\Theta^T)}{\partial \theta_k}\bigg|_{\Theta=0} = \left( \prod_{i=1}^{N} Y_{ii} \right) \frac{2 Y_{i_k j_k}(Y_{j_k j_k} - Y_{i_k i_k})}{Y_{i_k i_k} Y_{j_k j_k}}. \quad (12)$$

The derivative (12) differs from that of (7) only by a factor of $$2^{-1} Y_{i_k i_k}^{-1} Y_{j_k j_k}^{-1} \prod_{i=1}^{N} Y_{ii}.$$

Thus the equilibria are the same except that any $Y_{ii}=0$ gives an equilibrium. The occurrence of $Y_{ii}=0$ is a degenerate condition that would be accompanied by a row and column of zeros. It can only occur if X has a zero eigenvalue, meaning that the source vectors lie in a proper subspace with probability one. As in the case of minimization of $J_1$ by deterministic gradient descent, one can also prove a local convergence result for the desired equilibria in the above-described minimization of $J_2$, as follows.

Denote the eigenvalues of X by $\lambda_1 > \lambda_2 > \ldots > \lambda_N$. The gradient descent described by equations (2), (3), and (12) converges locally to a diagonalizing transform if $$0 < \mu < \left[ \left( \prod_{i=1}^{N} \lambda_i \right) \max_{i,j} \frac{(\lambda_i - \lambda_j)^2}{\lambda_i \lambda_j} \right]^{-1} = \left[ (\lambda_1 - \lambda_N)^2 \prod_{i=2}^{N-1} \lambda_i \right]^{-1}.$$

This convergence result can again be shown by linearizing the autonomous, nonlinear, discrete-time dynamical system implicitly defined. The result is summarized as $$F_{kl} = \left[ \frac{\partial^2 J_2}{\partial \theta_l \partial \theta_k} \right]\bigg|_{\Theta=0} = \begin{cases} 2\lambda_{i_k}^{-1} \lambda_{j_k}^{-1} (\lambda_{i_k} - \lambda_{j_k})^2 \prod_{i=1}^{N} \lambda_i & \text{if } k = l, \\ 0 & \text{otherwise.} \end{cases}$$

Requiring the eigenvalues of $I=\mu F$ to lie inside the unit circle completes the proof.

Stochastic descents will now be described for the two example cost functions $J_1$ and $J_2$. For the Karhunen-Loève filtering of a random signal, it is generally desirable to provide stochastic versions of the deterministic gradient descent algorithms previously described. More particularly, one would like to compute an update vector based on a single data vector such that the expected value of the update is the same as the update computed in the deterministic algorithm. This gives a stochastic algorithm that converges in mean under the step size conditions of the corresponding deterministic algorithm.

In well-known heuristic analyses of the LMS algorithm, e.g., from the above-cited reference P. M. Clarkson, "Optimal and Adaptive Signal Processing," CRC Press, Boca Raton, Fla., 1993, an "independence assumption" is used to simplify computations. Analyses based on the independence assumption are qualitatively accurate. One of the analyses below uses a similar independence assumption.

The minimization of $J_1$ by stochastic gradient descent will now be described. This process is referred to herein as Algorithm 1. To obtain an update following equation (7), let $$\theta_k = -\mu \frac{4}{3} y_{i_k} y_{j_k} (y_{j_k}^2 - y_{i_k}^2),$$

where the time index n has been suppressed. For Gaussian data, $$E[\theta_k] = -\mu 4 Y_{i_k j_k} (-Y_{i_k j_k}). \quad (14)$$

Therefore, the expected parameter vector changes in an algorithm using equations (2) and (13) are the same as those in the deterministic iteration of equations (2) and (3) with (7). The factor of 3 difference between equations (13) and (14) is specific to a Gaussian source. For a non-Gaussian source, one can absorb this factor into the step size selection.

Consider the adaptive filtering of a Gaussian signal with covariance matrix X using equations (2) and (13). It can be shown that the mean of the transform, in Givens parameterized form, converges locally under the conditions given in the above description of the corresponding deterministic descent.

Notice that in equation (13) the $\theta_k$ parameter depends only on the $i_k$ and $j_k$ components of y. This is desirable because it allows a parallelization of computations and a regularity of data flow, as is illustrated below in conjunction with FIG. 2.

The minimization of $J_2$ by stochastic gradient descent will now be described. This process is also referred to herein as Algorithm 2. In order to obtain such an algorithm, following equation (12), one possible choice is $$\theta_k = -\mu\left(\prod_{l=1}^{N} y_l^2\right) \frac{2y_{i_k} y_{j_k}(y_{j_k}^2 - y_{i_k}^2)}{3 y_{i_k}^2 y_{j_k}^2} = -\mu\left(\prod_{\substack{l=1 \\ l \ne i_k, j_k}}^{N} y_l^2\right) \frac{2}{3} y_{i_k} y_{j_k}(y_{j_k}^2 - y_{i_k}^2). \tag{15}$$

If the source is Gaussian and, for the purpose of examining the kth parameter, it is assumed that $y_{i_k}$ and $y_{j_k}$ are independent of the remaining components of y, $$E[\theta_k] = -\mu\left(\prod_{\substack{l=1 \\ l \ne i_k, j_k}}^{N} y_l^2\right) 2 Y_{i_k j_k} (Y_{j_k j_k} - Y_{i_k i_k}). \tag{16}$$

Consider the adaptive filtering of a Gaussian signal with covariance matrix X using equations (2) and (15). Using the independence assumption that yields equation (16), it can be shown that the mean of the transform, in Givens parameterized form, converges locally under the conditions given previously in conjunction with the corresponding deterministic descent.

Figure 2:
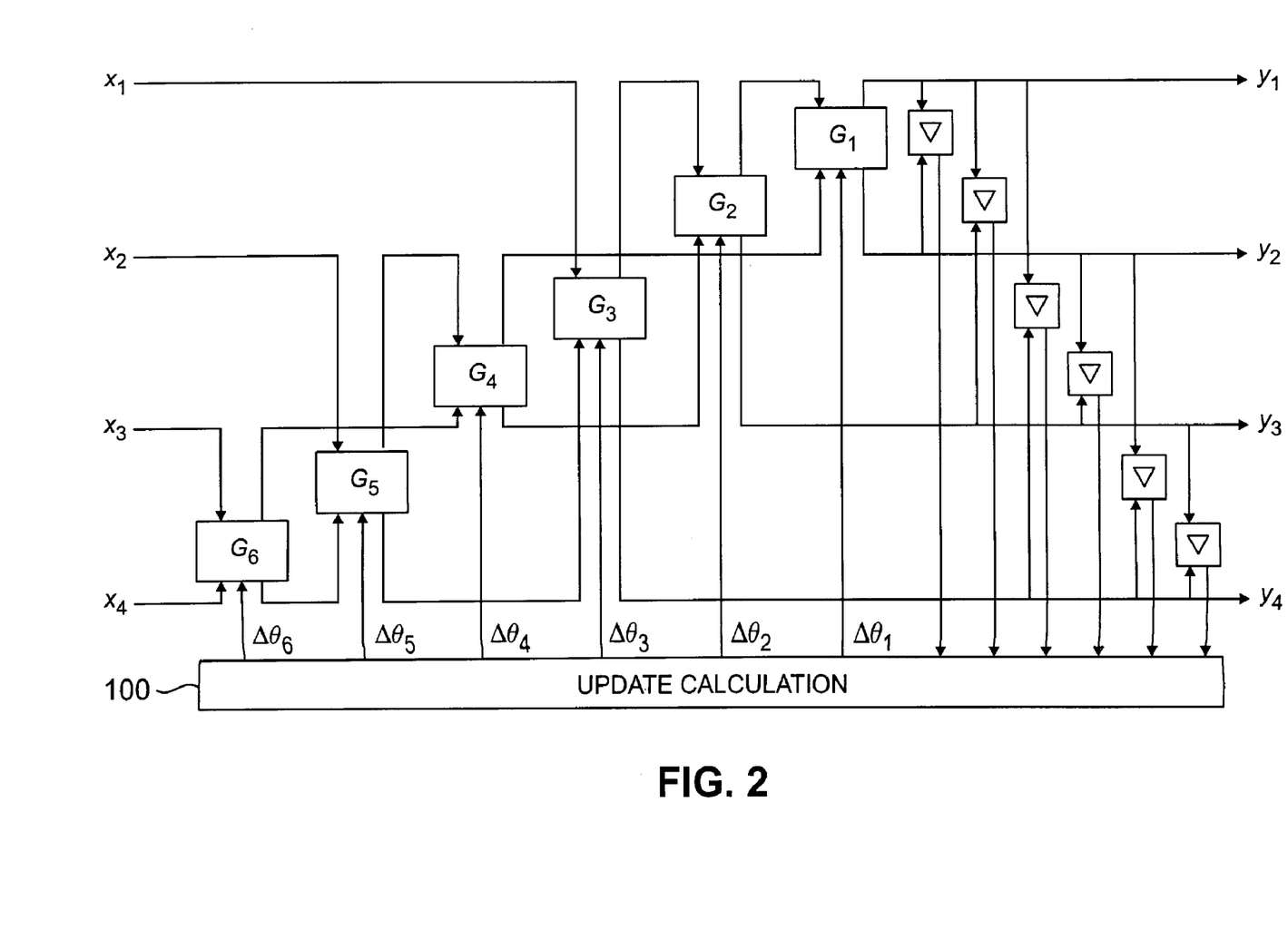
FIG. 2 is a schematic representation of a signal processing device which implements a stochastic approximation of a gradient descent algorithm in a Givens parameterized form in accordance with the invention.

With the exception of the $$\prod_{i=1}^{N} y_i^2$$

factor, which may be incorporated in an update calculation block 100 such as that shown in FIG. 2, the update rule (15) shares the desirable regularity and parallelizability features of the previously-described Algorithm 1.

FIG. 2 shows a schematic representation of signal processing device which implements a stochastic gradient update in a Givens parameterized form. The "∇" blocks represent gradient computations based on equations (13) or (15). It should be noted that all data dependencies are not shown for equation (15) in this particular representation. The update calculation block 100 is a scaling of the gradient by step size $\mu$, and the multiplication of Givens parameterized matrices may be implemented using conventional techniques, such as those described in, e.g., F. J. Vanpoucke, et al., "Factored Orthogonal Transformations For Recursive Eigendecomposition," IEEE Trans. Circuits Syst.-II: Anal. Dig. Sig. Proc., Vol. 44, No. 3, pp. 253–256, March 1997, which is incorporated by reference herein.

Pairwise Energy Compaction Algorithm (Algorithm 3)

Algorithms 1 and 2 in the previous section are based on a global property. More specifically, they are based on the diagonalizing property of a KLT; i.e., that the output of a KLT has a diagonal covariance matrix. In this section a different property of the KLT, i.e., maximal energy compaction, is used to derive a gradient descent algorithm illustrative of the present invention.

With the conventional sorting of basis vectors, the output of a KLT satisfies the following property of maximizing the energy in the lowest-numbered components:

$$\sum_{l=1}^{m} Y_{ll} = \max_{orthogonal T} \sum_{l=1}^{m} Y_{ll}, \text{ for } m = 1, 2, \ldots, N.$$

See, e.g., K. R. Rao, "Discrete Cosine Transform: Algorithms, Advantages, Applications," Academic Press, 1990, which is incorporated by reference herein. This property will be utilized in the following equivalent, but less common form.

$$\sum_{l=m}^{N} Y_{ll} = \max_{orthogonal T} \sum_{l=m}^{N} Y_{ll}, \text{ for } m = 1, 2, \ldots, N.$$

This form uses gradient descent instead of the gradient ascent of the previous form. Because of the essential uniqueness of the KLT, the energy packing property can be indirectly captured by the global cost functions $J_1$ and $J_2$. However, this section will not be concerned with global behavior, but will instead determine how the energy packing property manifests itself between pairs of transform coefficients. Having local optimality in each pair gives the desired global property as a byproduct.

Referring again to the schematic representation of FIG. 1, if the transform is a KLT, then $y_4$ has minimum possible power, $y_3$ has minimum power given that $y_4$ is fixed, etc. This suggests that a KLT can be obtained by adjusting each Givens rotation in FIG. 1 to minimize the power sent to the lower branch. As will be demonstrated below, this approach in fact leads to a locally convergent adaptation algorithm.

Regardless of the size of the overall transform, the operation of rotation block $G_k$ is described by $$\begin{bmatrix} x''_{i_k} \\ x''_{j_k} \end{bmatrix} = \begin{bmatrix} \cos\theta_k & \sin\theta_k \\ -\sin\theta_k & \cos\theta_k \end{bmatrix} \begin{bmatrix} x'_{i_k} \\ x'_{j_k} \end{bmatrix} = \begin{bmatrix} x'_{i_k}\cos\theta_k + x'_{j_k}\sin\theta_k \\ -x'_{i_k}\sin\theta_k + x'_{j_k}\cos\theta_k \end{bmatrix},$$

where x' and x" denote the input and output, respectively, of that transform stage. Now since $$\frac{\partial (x''_{j_k})^2}{\partial \theta_k} = 2 x''_{j_k} \frac{\partial x''_{j_k}}{\partial \theta_k} = 2 x''_{j_k}(-x'_{i_k}\cos\theta_k - x'_{j_k}\sin\theta_k) = -2 x''_{j_k} x''_{i_k}, \tag{18}$$

increasing $\theta_k$ by $2\mu x_{j_k}'' x_{i_k}''$ is an instantaneous gradient descent of the energy in the lower branch. This gradient is very convenient because it is simply the product of quantities that are computed in the transform itself.

To ascertain the convergence in mean of the new iteration described above, the expected update $\theta_k$, derived from equation (18), is used:

$$E\left[\frac{\theta_k}{2\mu}\right] = E\left[(x'_{i_k}\cos\theta_k + x'_{j_k}\sin\theta_k)(-x'_{i_k}\sin\theta_k + x'_{j_k}\cos\theta_k)\right] \quad (19)$$

$$= \frac{1}{2}(E[x'^2_{j_k}] - E[x'^2_{i_k}])\sin 2\theta_k + E[x'_{i_k}x'_{j_k}]\cos 2\theta_k.$$

Since $x_{i_k}'$ and $x_{j_k}'$ depend on all earlier rotation stages, the components of $\hat{\Theta}$ are coupled in a complicated way. However, using the approach of the previous section, the descent can be used to compute a multiplicative update, as illustrated in FIG. 2. The resulting update algorithm is referred to herein as Algorithm 3. The convergence in mean then depends only on the behavior of the expected gradient (19) around 0.

Denote the eigenvalues of X by $\lambda_1 > \lambda_2 > \ldots > \lambda_N$. It can be shown that the deterministic iteration described by equation (2) with $$\theta_k = \mu 2 Y_{i_k j_k}$$

converges locally to a diagonalizing transform if $$0 < \mu < \left[\max_{i<j}(\lambda_i - \lambda_j)\right]^{-1} = \frac{1}{\lambda_1 - \lambda_N}.$$

Under the same step size bounds, it can be shown that the stochastic iteration described by equation (2) with $$\theta_k = \mu 2 y_{i_k} y_{j_k} \quad (20)$$

gives a transform sequence that, in Givens parameterized form, converges locally.

As in the proofs of convergence given for the deterministic descents described previously, the expected value of the parameter vector is described by a discrete-time dynamical system. Linearizing about the desired equilibrium, the stability of $$\hat{\Theta}_{n+1} = (I + \mu F)\hat{\Theta}_n \text{ where } F_{ij} = \left[\frac{\partial}{\partial\theta_j}E\left[\frac{\theta_i}{\mu}\right]\right]\bigg|_{\Theta=0},$$

is established. This yields for the diagonal elements of F, $$F_{kk} = \left[\frac{\partial}{\partial\theta_k}E\left[\frac{\theta_k}{\mu}\right]\right]\bigg|_{\Theta=0} \quad (21)$$

$$= \left[2(E[x'^2_{j_k}] - E[x'^2_{i_k}])\cos 2\theta_k - 4E[x'_{i_k}x'_{j_k}]\sin 2\theta_k\right]\bigg|_{\Theta=0}$$

$$= 2(E[x^2_{j_k}] - E[x^2_{i_k}]) = 2(X_{j_k} - X_{i_k}),$$

and the off-diagonal elements are $$F_{kl} = \left[\frac{\partial}{\partial\theta_l}E\left[\frac{\theta_k}{\mu}\right]\right]\bigg|_{\Theta=0} \quad (22)$$

$$= \left[\underbrace{\frac{\partial(E[x'^2_{j_k}] - E[x'^2_{i_k}])}{\partial\theta_l}}_{\to 0 \text{ as } \Theta \to 0}\sin 2\theta_k + 2\underbrace{\frac{\partial E[x'_{i_k}x'_{j_k}]}{\partial\theta_l}}_{\to 0 \text{ as } \Theta \to 0}\cos 2\theta_k\right]\bigg|_{\Theta=0}$$

-continued $$= 0.$$

The eigenvalues of F are $2(\lambda_{j_k} - \lambda_{i_k})$, k=1, 2, . . . , K; thus the eigenvalues of I+$\mu$F are $1+\mu 2(\lambda_{j_k} - \lambda_{i_k})$. When all the eigenvalues lie in the unit circle, the dynamical system converges locally to the desired equilibrium.

Simulations and Comparisons

The mean convergence rates of the above-described illustrative update algorithms will now be examined in greater detail. The linearizations used in the above convergence proofs facilitate estimation of rates of convergence. Consider Algorithm 1, the stochastic gradient descent with respect to $J_1$. In the vicinity of the desired equilibrium, the error in $\theta_k$ at the nth iteration is given approximately by $$c[1 - 4\mu(\lambda_{i_k} - \lambda_{j_k})^2]^n$$

based on equation (9). For local stability in this example, the bracketed quantity is required to be in the interval (−1,1) for all k. Furthermore, the bracketed quantity should be as close to zero as possible, in order to provide fast convergence. The ability to do this through the choice of $\mu$ is limited by the variability of $(\lambda_{i_k} - \lambda_{j_k})^2$. Accordingly, one can define pseudo-eigenvalue spreads for the three illustrative algorithms as follows:

$$s_1(X) = \frac{\max_{i<j}(\lambda_i - \lambda_j)^2}{\min_{i<j}(\lambda_i - \lambda_j)^2}, \quad s_2(X) = \frac{\max_{i<j}\frac{(\lambda_i - \lambda_j)^2}{\lambda_i \lambda_j}}{\min_{i<j}\frac{(\lambda_i - \lambda_j)^2}{\lambda_i \lambda_j}}, \text{ and}$$

$$s_3(X) = \frac{\max_{i<j}(\lambda_i - \lambda_j)}{\max_{i<j}(\lambda_i - \lambda_j)}.$$

These pseudo-eigenvalue spreads may be viewed as analogous to the eigenvalue spread in LMS adaptive filtering as described in the above-cited P. M. Clarkson reference, "Optimal and Adaptive Signal Processing," CRC Press, Boca Raton, Fla., 1993.

Notice that a pseudo-eigenvalue spread is not less than one and that $s_1(X) = (s_3(X))^2 \geq s_3(X)$. This suggests that with appropriate step size choices, Algorithm 3 will have faster local convergence than Algorithm 1 for any signal. The difference between $s_1(X)$ and $s_2(X)$ suggests that the superior choice between Algorithms 1 and 2 will depend on X along with the choice of $\mu$. These observations are confirmed through the following example.

Consider the matrices $$X_1 = \text{diag}\left(\left[1, \frac{7}{8}, \frac{5}{8}, \frac{1}{2}\right]\right) \text{ and } X_2 = \text{diag}\left(\left[1, \frac{1}{2}, \frac{1}{4}, \frac{1}{8}\right]\right),$$

for which $$s_1(X_1) = 16 < 28 = s_2(X_1) \text{ and } s_1(X_2) = 49 > \frac{49}{4} = s_2(X_2).$$

Based on these pseudo-eigenvalue spreads, it is expected that the Algorithm 1 global descent with respect to $J_1$ will perform better than the Algorithm 2 global descent with respect to $J_2$ for matrix $X_1$, and vice versa for matrix $X_2$. For Algorithm 3, $s_3(X_1)=4$ and $s_3(X_2)=7$. These are the smallest spreads, so it is expected that Algorithm 3 will have the fastest convergence for both of the matrices in this example.

Figure 3A:
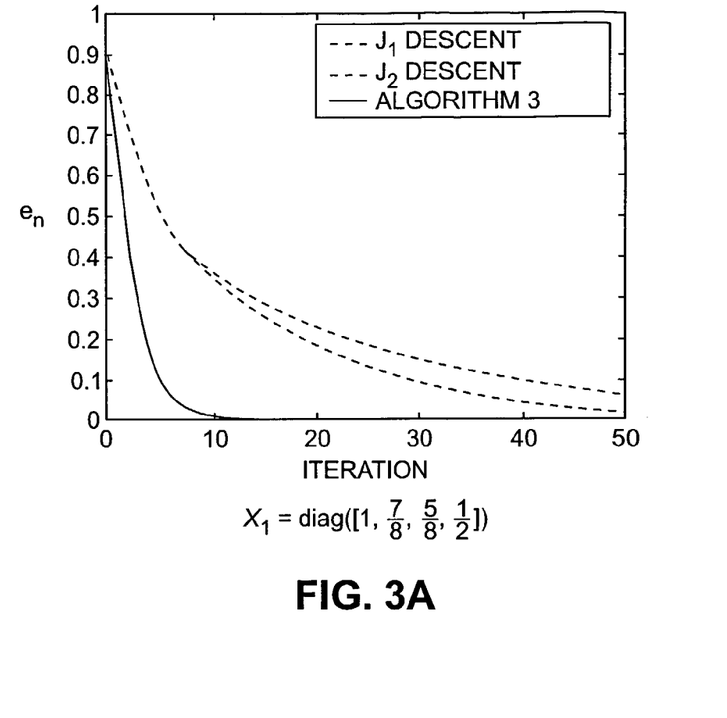
FIGS. 3A and 3B show plots of deterministic simulations which demonstrate differences in rates of mean convergence for gradient descent algorithms as applied to example source signals.
Figure 3B:
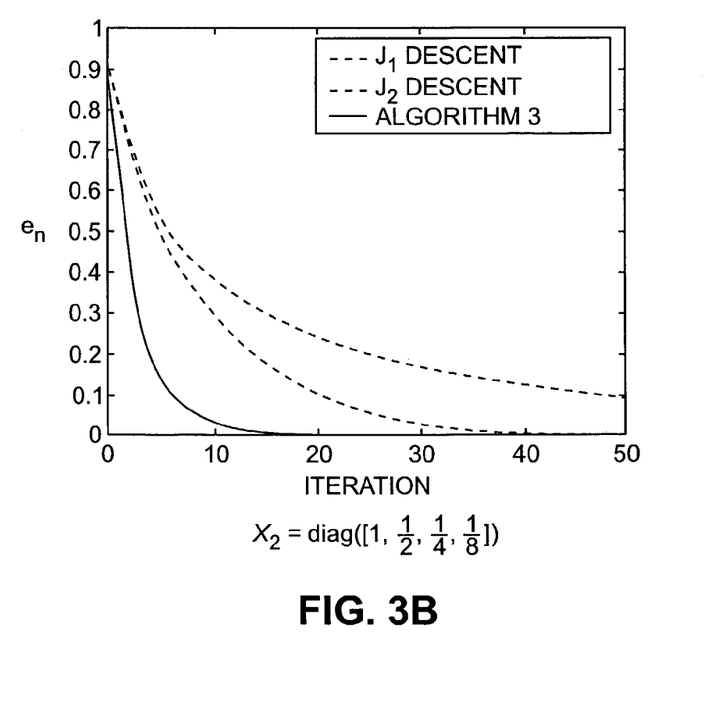

FIGS. 3A and 3B show deterministic simulation results for each of the three algorithms for the respective $X_1$ and $X_2$ matrices of the above example. Algorithm 1 is the global gradient descent with respect to $J_1$ as in equation (13), Algorithm 2 is the global descent with respect to $J_2$ as in equation (15), and Algorithm 3 is the pairwise energy compaction descent in accordance with equation (20). The simulation results indicate that the performance is as predicted. In the simulations, each algorithm was used with the step size $\mu$ that maximized the speed of convergence of the slowest mode, as given in Table 1 below. Since the signal statistics are not known in advance, the step size selection will generally not be optimal. However, the pseudo-eigenvalue spread provides a bound on performance.

TABLE 1

Step Sizes Used in Simulations of Mean Convergence

|  | $X_1$ | $X_2$ |
| --- | --- | --- |
| Algorithm 1 | 32/17 | 16/25 |
| Algorithm 2 | 1024/145 | 512/53 |
| Algorithm 3 | 8/5 | 1 |

The simulation results are averaged over 100 randomly chosen initial transforms. Each curve in FIGS. 3A and 3B thus represents the average of 100 simulations with randomly chosen initial transforms corresponding to $\Theta$ uniformly distributed on $[-\pi/4, \pi/4)$. Convergence could also be measured by $J_1$ or $J_2$, and results of this type are given in the above-cited Ph.D. thesis of V. K. Goyal. At each iteration, the error in the transform is measured by the Frobenius norm of the difference between a true KLT, i.e., an identity matrix, and the adapted transform. Since the interest is in finding any KLT, this approach uses the minimum norm over all row permutations and multiplications of rows by ±1:

$$e_n = \min_{\substack{permutations P \\ diagonal\ \sigma\ s.t. \sigma^2 = 1}} \|I - \sigma P T_n\|_F.$$

Stochastic simulations have also been performed on the three illustrative update algorithms. In the stochastic setting, e.g., using equations (13), (15) or (20), transform updates are on average in the correct direction, but may have high variance. The step size should not actually be chosen close to the previously-described predicted bound for stability. The simulations described below in conjunction with FIGS. 4A, 4B and 4C indicate that a good choice is one or two orders of magnitude less than the bound.

Consider by way of example a zero-mean Gaussian source with covariance matrix $$X = \begin{bmatrix} 1 & 0.6 & 0.36 & 0.218 \\ 0.6 & 1 & 0.6 & 0.36 \\ 0.36 & 0.6 & 1 & 0.6 \\ 0.218 & 0.36 & 0.6 & 1 \end{bmatrix}.$$

Figure 4A:
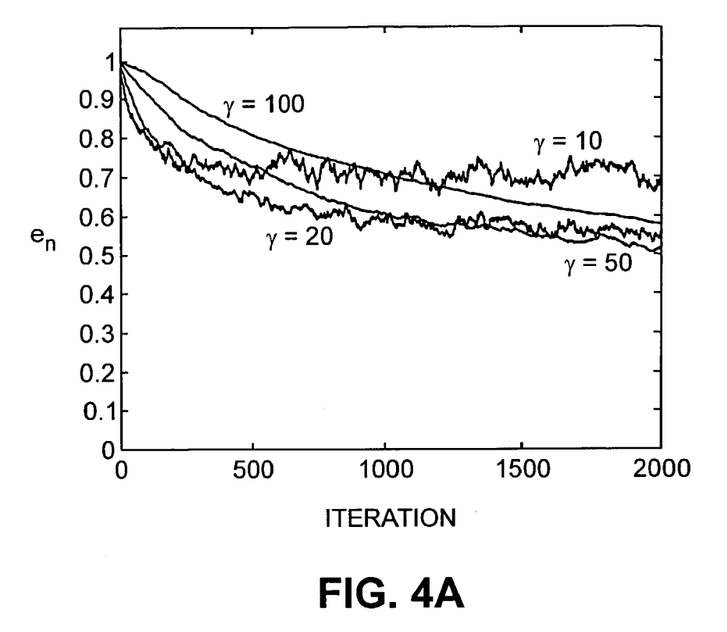
FIGS. 4A, 4B and 4C show plots of stochastic simulations for gradient descent algorithms.
Figure 4B:
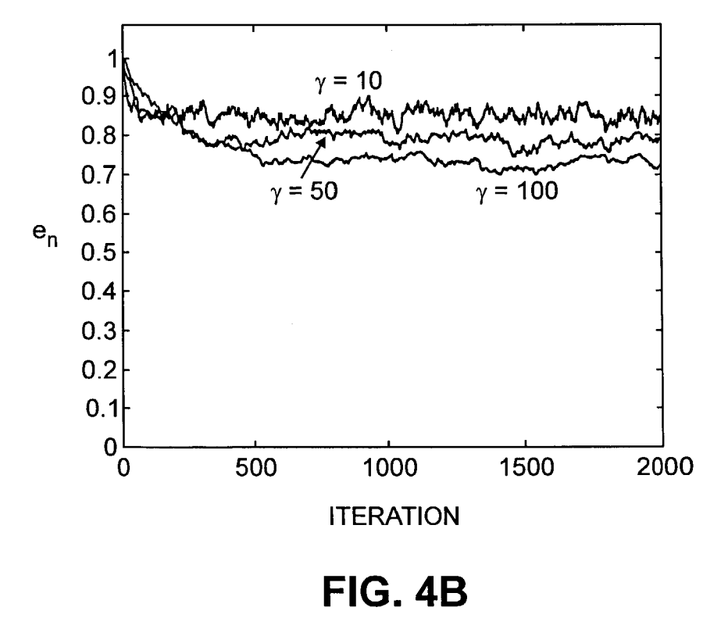
Figure 4C:
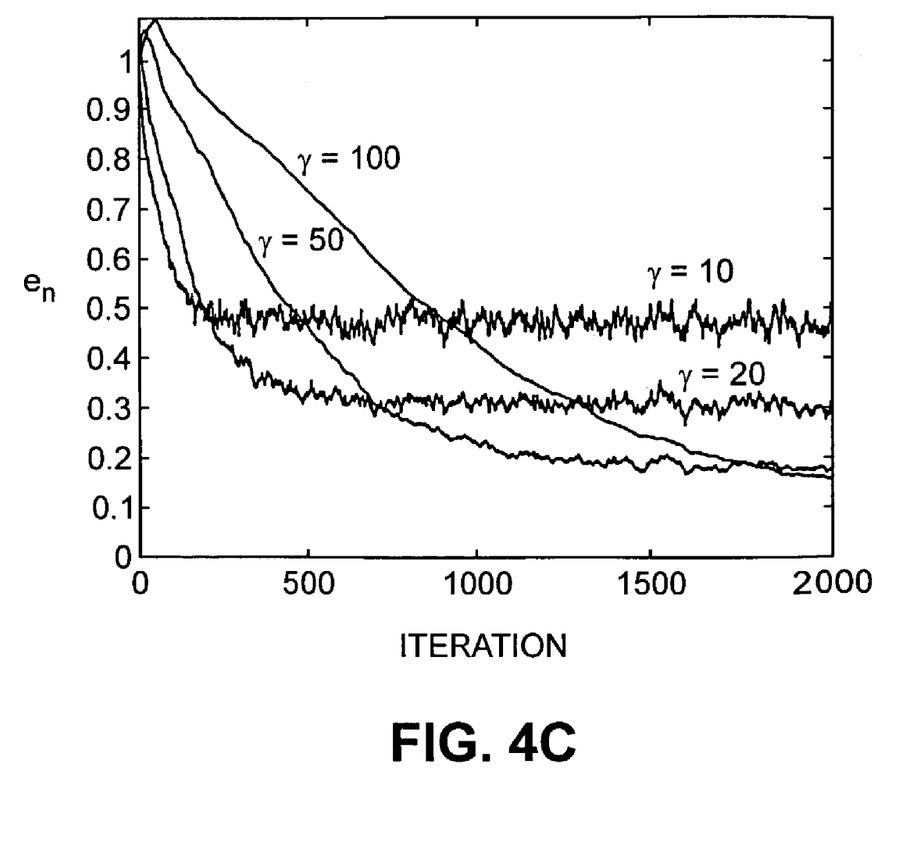

FIGS. 4A, 4B and 4C show stochastic simulation results for Algorithm 1, Algorithm 2 and Algorithm 3, respectively, using the example four-dimensional source X given above. The source is Gaussian with $E[x_i x_j]=0.6^{|i-j|}$. In all simulations the initial transform was the identity transform. After finding the eigenvalues of X, predicted bounds for stability $\mu_1^* \approx 0.1131$, $\mu_2^* \approx 0.5864$, and $\mu_3^* \approx 0.4757$ were computed for the three algorithms, respectively. The simulations used $\mu = \mu^*/\gamma$ for various values of $\gamma$, where $\mu^*$ is the maximum step size for convergence in mean. The resulting curves are labeled by $\gamma$ in the figures. Each curve represents the average of 100 simulations.

Based on intuition from LMS filtering, one would expect a trade-off between speed of convergence and steady-state error. The results shown in FIGS. 4A, 4B and 4C confirm this intuition. More particularly, it can be seen from the curves that with a large step size (small $\gamma$), steady state is approached quickly, but the steady-state error is large, while with smaller step sizes (larger $\gamma$), steady-state error is smaller but convergence is slower. In each of FIGS. 4A, 4B and 4C, the lower hull of the curves gives the minimum error for a given number of iterations, assuming a fixed step size. This lower hull is lowest for Algorithm 3. The superiority of this algorithm is also predicted by comparing pseudo-eigenvalue spreads.

Implementation for Backward Adaptive Transform Coding

An implementation of the invention for backward adaptive transform coding will now be described. In adaptive transform coding, adaptation of the transform in the encoder must be accompanied by corresponding adaptation in the decoder. With a typical forward adaptive structure, changes to the transform must be encoded and sent along with the encoded data. An alternative is to base the transform updates only on data available at the decoder. In this case, the decoder can deduce the correct decoding transform by running the same adaptation algorithm as the encoder. This is analogous to the use of backward adaptation of prediction filters and quantizer scaling in adaptive differential pulse-coded modulation (ADPCM), as described in, e.g., R. V. Cox, "Speech Coding," The Digital Signal Processing Handbook, Chapter 45, CRC and IEEE Press, pp. 45.1–45.19, 1998, which is incorporated by reference herein.

Of course, quantization is an irreversible reduction in information. For a given accuracy, estimation of the source covariance requires more samples when using quantized data. Estimating moments of the source by moments of the quantized data introduces a bias, which for a Gaussian source is described in, e.g., L. Cheded, et al., "The Exact Impact of Amplitude Quantization on Multi-Dimensional, High-Order Moments Estimation," Signal Proc., Vol. 39, No. 3, pp. 293–315, September 1994, which is incorporated by reference herein. For uncorrelated components, the bias disappears from cross moment estimates, such that the bias from quantization has no effect at convergence. The primary effect of quantization is to increase the steady-state error when the quantization is very coarse. Quantization may speed the initial stages of convergence by amplifying small sample values.

Figure 5:
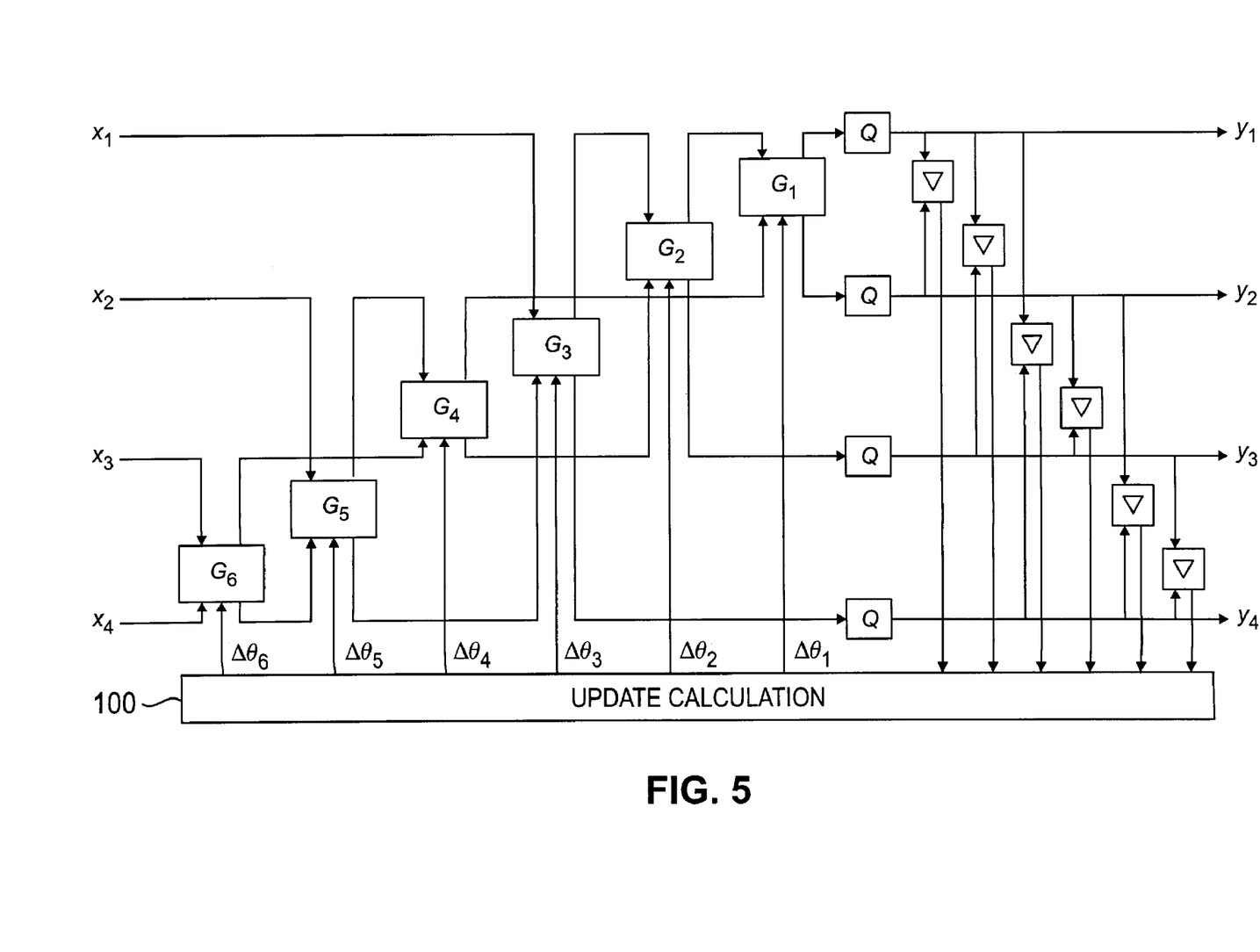
FIG. 5 shows a schematic representation of a signal processing device for backward adaptive transform coding in accordance with the invention.

FIG. 5 shows a signal processing device which includes an encoding and adaptation structure for backward adaptive transform coding in accordance with the invention. Each of the elements labeled Q represents a quantizer, but the structure is otherwise similar to that of the signal processing device of FIG. 2.

When the transform adaptation is driven exclusively by quantized data that will be transmitted to a decoder, it is not necessary to separately encode the transform update. Instead, by using the same adaptation rules, the decoder can track the transform used in the encoder.

Figure 6:
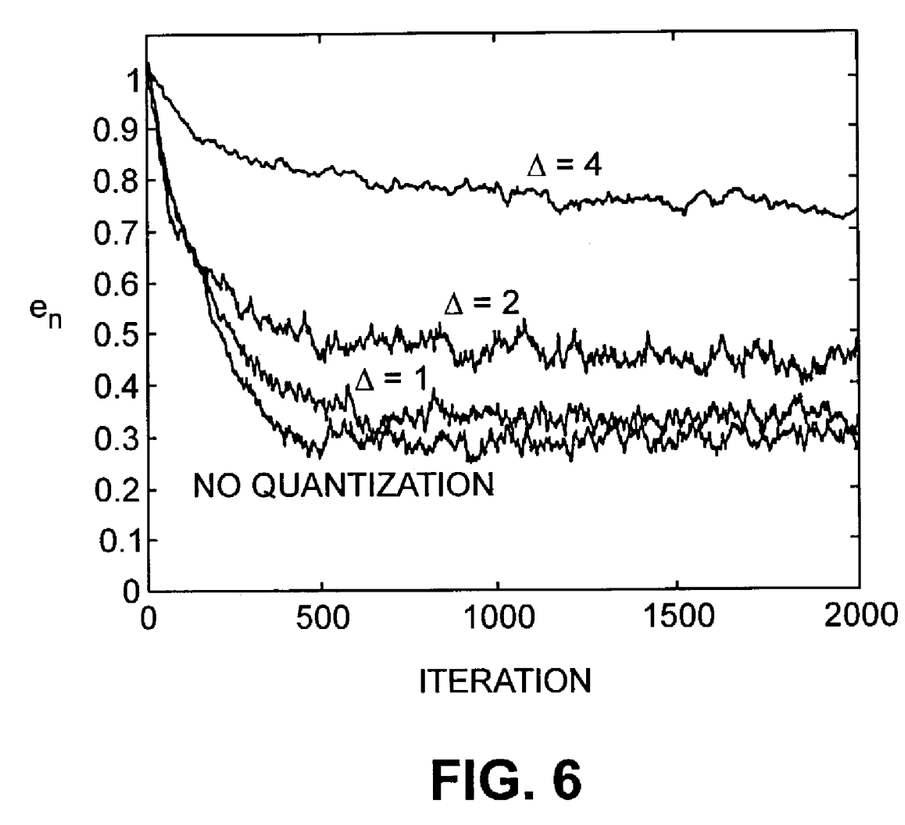
FIG. 6 shows plots of simulations of a backward adaptive version of a gradient descent algorithm in accordance with the invention.

FIG. 6 shows the results of simulations of a backward adaptive version of Algorithm 3, using the same example four-dimensional source X as the previous example. The source in these simulations is thus Gaussian with $E[x_i x_j]$ =$0.6^{|i-j|}$. The initial transform is again the identity transform, and the step size is again $\mu=\mu^*/\gamma$, where $\mu^*$ is the maximum step size for convergence in mean. Based on the results depicted in FIG. 4C, the step size $\mu=\mu^*/20\approx0.02378$ was chosen, i.e., $\gamma=20$. The quantization is unbounded and uniform with quantization step size $\Delta$. The curves in FIG. 6 correspond to different values of $\Delta$, the step size of the uniform scalar quantizer used in the encoder, and a curve for the no quantization case is included for comparison purposes. Each curve represents the average of 50 simulations.

It can be seen from the curves of FIG. 6 that for a reasonable range of quantization step sizes, the use of quantized data increases the steady-state error slightly and has little effect on the rate of convergence. Several other simulations of this type are presented in the above-cited Ph.D. thesis of V. K. Goyal, including cases where the source is time-varying.

The above-described embodiments of the invention are intended to be illustrative only. Alternative embodiments of the invention may utilize other signal processing devices, with different arrangements and configurations of elements. For example, the invention may utilize reduced-parameter forms other than the Givens parameterized form described herein, such as a Householder form. The techniques of the invention are also applicable to any desired type of source signal(s). Moreover, the invention may be used for a wide variety of different types of signal processing applications other than those described herein. Furthermore, the above-described processing operations of the invention may be implemented in whole or in part using one or more software programs. These and numerous other alternative embodiments within the scope of the following claims will be apparent to those skilled in the art.

What is claimed is:

1. A signal processing method comprising the steps of:
   processing a signal in a signal processing device configured to implement a transform for producing a desired transformed output signal; and
   updating the transform during the processing step based on received data associated with the signal being processed, so as to track a basis associated with the transform;
   wherein the transform is represented in a reduced-parameter form and the updating step is implemented using computations involving the reduced-parameter form, the computations being configured to provide local optimization of an energy compaction property of the transform for a given pair of transform coefficients.

2. The method of claim 1 wherein the transform comprises a Karhunen-Loève transform.

3. The method of claim 1 wherein the reduced-parameter form for an N×N transform comprises fewer than $N^2$ parameters.

4. The method of claim 1 wherein an adaptation of the transform is represented directly as one or more changes in the reduced-parameter form.

5. The method of claim 1 wherein the reduced-parameter form comprises a Givens parameterized form.

6. The method of claim 5 wherein the updating step utilizes multiplications of Givens parameterized matrices computed in parametric form.

7. The method of claim 1 wherein the reduced-parameter form comprises a Householder form.

8. The method of claim 1 wherein the updating step avoids the need for an explicit eigendecomposition operation in implementing the transform.

9. The method of claim 1 wherein the updating step makes adjustments in the transform so as to minimize a negative gradient of a pairwise energy compaction property of the transform.

10. The method of claim 9 wherein the negative gradient minimization is locally convergent in mean for a specified step size.

11. The method of claim 1 wherein the transform comprises a backward adaptive transform and the updating step is driven by quantized data.

12. A signal processing method comprising the steps of:
    processing a signal in a signal processing device configured to implement a transform for producing a desired transformed output signal; and
    updating the transform during the processing step based on received data associated with the signal being processed, so as to track a basis associated with the transform;
    wherein the transform is represented in a reduced-parameter form and the updating step is implemented using computations involving the reduced-parameter form;
    wherein the updating step makes adjustments in the transform so as to minimize a negative gradient of a pairwise energy compaction property of the transform; and
    wherein the adjustment for a kth parameter of the transform associated with a particular one of a plurality of Givens rotations is given by $\theta_k = \mu 2 y_{i_k} y_{j_k}$, where $\mu$ is the step size of the gradient algorithm, $y_i$ and $y_j$ are designated pairs of elements of a matrix $Y=TXT^T$, T is a matrix representing the transform, and X is a matrix representing elements of the signal being processed.

13. An apparatus comprising:
    a signal processing device comprising an integrated circuit, the device being configured to implement a transform for processing a signal so as to produce a desired transformed output signal, the device further being operative to implement a process for updating the transform while processing the signal, in accordance with received data associated with the signal, wherein the transform is represented in a reduced-parameter form and the updating process is implemented using computations involving the reduced-parameter form, the computations being configured to provide local optimization of an energy compaction property of the transform for a given pair of transform coefficients.

14. The apparatus of claim 13 wherein the transform comprises a Karhunen-Loève transform.

15. The apparatus of claim 13 wherein the reduced-parameter form for an N×N transform comprises fewer than $N^2$ parameters.

16. The apparatus of claim 13 wherein an adaptation of the transform is represented directly as one or more changes in the reduced-parameter form.

17. The apparatus of claim 13 wherein the reduced-parameter form comprises a Givens parameterized form.

18. The method of claim 17 wherein the updating process utilizes multiplications of Givens parameterized matrices computed in parametric form.

19. The apparatus of claim 13 wherein the reduced-parameter form comprises a Householder form.

20. The apparatus of claim 13 wherein the updating process avoids the need for an explicit eigendecomposition operation in implementing the transform.

21. The apparatus of claim 13 wherein the updating process makes adjustments in the transform so as to minimize a negative gradient of a pairwise energy compaction property of the transform.

22. The apparatus of claim 21 wherein the negative gradient minimization is locally convergent in mean for a specified step size.

23. The apparatus of claim 13 wherein the transform comprises a backward adaptive transform and the updating step is driven by quantized data.

24. An apparatus comprising:
a signal processing device comprising an integrated circuit, the device being configured to implement a transform for processing a signal so as to produce a desired transformed output signal, the device further being operative to implement a process for updating the transform while processing the signal, in accordance with received data associated with the signal, wherein the transform is represented in a reduced-parameter form and the updating process is implemented using computations involving the reduced-parameter form;
wherein the updating process makes adjustments in the transform so as to minimize a negative gradient of a pairwise energy compaction property of the transform; and
wherein the adjustment for a kth parameter of the transform associated with a particular one of a plurality of Givens rotations is given by $\theta_k = \mu 2 y_{i_k} y_{j_k}$, where $\mu$ is the step size of the gradient algorithm, $y_i$ and $y_j$ are designated pairs of elements of a matrix $Y = TXT^T$, T is a matrix representing the transform, and X is a matrix representing elements of the signal being processed.

25. A machine-readable medium for storing one or more software programs for use in processing a signal in a signal processing device configured to implement a transform for producing a desired transformed output signal, the one or more software programs when executed implementing the step of:
updating the transform based on received data associated with the signal being processed, so as to track a basis associated with the transform;
wherein the transform is represented in a reduced-parameter form and the updating step is implemented using computations involving the reduced-parameter form, the computations being configured to provide local optimization of an energy compaction property of the transform for a given pair of transform coefficients.

* * * * *